(12) United States Patent
Komori et al.

(10) Patent No.: US 7,609,312 B2
(45) Date of Patent: Oct. 27, 2009

(54) DRIVING CONTROLLING METHOD FOR IMAGE SENSING DEVICE, AND IMAGING DEVICE

(75) Inventors: Hideaki Komori, Kanagawa (JP); Akihiko Nose, Kanagawa (JP)

(73) Assignee: Sony Corporation, Tokyo (JP)

( * ) Notice: Subject to any disclaimer, the term of this patent is extended or adjusted under 35 U.S.C. 154(b) by 550 days.

(21) Appl. No.: 11/387,266

(22) Filed: Mar. 23, 2006

(65) Prior Publication Data

US 2006/0215050 A1 Sep. 28, 2006

(30) Foreign Application Priority Data

Mar. 25, 2005 (JP) ............................ P2005-089497

(51) Int. Cl.
*H04N 5/335* (2006.01)
(52) U.S. Cl. ........................................ 348/320; 348/86
(58) Field of Classification Search ................. 348/320, 348/283, 230.01, 294, 296, 321, 253
See application file for complete search history.

(56) References Cited

U.S. PATENT DOCUMENTS

| | | | |
|---|---|---|---|
| 5,422,670 A * | 6/1995 | Fukui | 348/296 |
| 6,028,630 A * | 2/2000 | Fukui et al. | 348/312 |
| 6,519,000 B1 * | 2/2003 | Udagawa | 348/220.1 |
| 6,765,616 B1 * | 7/2004 | Nakano et al. | 348/322 |

FOREIGN PATENT DOCUMENTS

| | | |
|---|---|---|
| JP | 1 120973 | 5/1989 |
| JP | 5 7347 | 1/1993 |
| JP | 7 135592 | 5/1995 |
| JP | 10 145683 | 5/1998 |
| JP | 2003 158684 | 5/2003 |

OTHER PUBLICATIONS

Patent Abstracts of Japan, publication No. 10-191177 dated Jul. 21, 1998.

* cited by examiner

*Primary Examiner*—David L Ometz
*Assistant Examiner*—Ahmed A Berhan
(74) *Attorney, Agent, or Firm*—Frommer Lawrence & Haug LLP; William S. Frommer; Thomas F. Presson

(57) ABSTRACT

A driving controlling method and system for an interline transfer type solid-state image sensing device. The device is driven by setting an arbitrary horizontal extraction period is set in a horizontal sync period, and making a selection between a first horizontal transfer signal and second horizontal transfer signal which is to be transferred at a higher rate than the first horizontal transfer signal.

5 Claims, 12 Drawing Sheets

DRIVING CONTROLLING METHOD FOR IMAGE SENSING DEVICE, AND IMAGING DEVICE

CROSS REFERENCES TO RELATED APPLICATIONS

The present invention contains subject matter related to Japanese Patent Application JP 2005-089497 filed in the Japanese Patent Office on Mar. 25, 2005, the entire content of which is incorporated herein by reference.

BACKGROUND OF THE INVENTION

1. Field of the Invention

The present invention relates to a driving controlling method for an image sensing device and an imaging device, adopted in an imaging system, monitoring system, etc. oriented for the factory automation (FA) to image, for example, an object moving at a high speed.

2. Description of the Related Art

In the imaging devices for FA and monitoring, rapid extraction of only video information has been attained in the past by transferring an unnecessary signal at a high rate to sweep them away while transferring a necessary signal at a normal rate for processing them as valid pixels. This is called "high-rate function", for example. To have the imaging device as a camera with the high-rate function, it is necessary to enter a reference signal indicative of a start point of a rapid-transfer period and also a control signal indicating that the imaging device is operating in the rapid-transfer period.

The Applicant of the present invention proposed an image sensing device driving controlling method, imaging device, imaging controlling apparatus and imaging system, in which valid charges falling within a predetermined imaging range can be acquired as video signals by capturing images with a high-speed random shutter synchronized with a trigger signal by controlling the effective charge storage time of a solid-state image sensing device (CCD image sensor) of an interline transfer (IT) type (see the Japanese Patent Application Laid Open No. 191177 of 1998, for example).

In the imaging system, an image charge stored in each of a plurality of light-receiving elements in the IT type solid-state image sensing device is read to vertical transfer units in response to a charge read signal of a predetermined timing based on the trigger signal, the image charges read to the vertical transfer units are vertically transferred at a high rate synchronously with a vertical sync pulse and then read as image signal from the vertical transfer units via a horizontal transfer unit at a normal transfer rate synchronous with a horizontal sync signal. In this imaging system, valid charges falling within an arbitrary imaging range can be acquired as image signals by setting a rapid-transfer period to change the number of lines outputted as image signals.

When it is desired to extract a certain horizontal image from a valid image output, the image has been extracted in the past via a memory 103 as in an imaging device 100 shown in FIG. 1. More specifically, in the imaging device 100, an image signal (So) read from a CCD image sensor 101 in response to horizontal transfer clocks (H1, H2) synchronous with a horizontal sync signal (HD) supplied from a timing generator 104 is digitized by an analog-digital converter 102, and all valid image data (Do) are written once into the memory 103. When reading image data from the memory 103, only necessary horizontal image data (Da) is read according to a horizontal blanking signal (HBLK) supplied from the timing generator 104, as in a timing diagram shown in FIG. 2.

SUMMARY OF THE INVENTION

In the conventional imaging device 100 using the above memory 103, however, in case necessary data is transmitted frame by frame, image information cannot be transmitted at a high rate and efficiently. The reason for this fact is that unless image data for entry to the memory 103 are transmitted at a high rate, same data is repeatedly transmitted some times, which will give a false appearance of the data transmission to be high. Since data is read out of the memory 103 at a rate higher than a rate at which the data has been written to the memory 103, the data read rate should not be higher than the data write rate.

It is therefore desirable to overcome the above-mentioned drawbacks of the related art by providing an image sensing device driving controlling method and an imaging device, capable of extracting captured image data from an arbitrary area at a high rate.

According to the present invention, there is provided a driving controlling method for an interline transfer type solid-state image sensing device including a light-receiving unit in which there is disposed in the form of a matrix a plurality of light-receiving elements each of which produces and stores a charge corresponding to the amount of light incident thereupon, vertical transfer units to transfer a charge read from each of the light-receiving elements in the light-receiving unit, and a horizontal transfer unit to output the charges transferred via the vertical transfer units, the interline transfer type solid-state image sensing device being adapted such that the charge stored in each of the plurality of light-receiving elements is read to the vertical transfer units synchronously with the timing of an external trigger signal, the charges read to the vertical transfer units are vertically transferred at a first transfer rate in response to a high-rate vertical transfer signal for a high-rate transfer period, and the charges in the vertical transfer units are vertically transferred at a second transfer rate slower than the first transfer rate in response to a normal-rate vertical transfer signal for a normal-rate transfer period following the high-rate transfer period, to thereby output the charges supplied to the horizontal transfer unit for the normal-rate transfer period as valid ones from the horizontal transfer unit, the method being such that the interline transfer type solid-state image sensing device is driven by setting an arbitrary horizontal extraction period is set in a horizontal sync period, and making a selection between a first horizontal transfer signal and second horizontal transfer signal which is to be transferred at a higher rate than the first horizontal transfer signal while selection is made between a first horizontal sync signal corresponding to the first horizontal transfer signal and a first horizontal blanking signal and a second horizontal sync signal corresponding to the second horizontal transfer signal and a second horizontal blanking signal, to provide the first horizontal transfer signal, first horizontal sync signal corresponding to the first horizontal transfer signal and the first horizontal blanking signal for the horizontal extraction period while providing the second horizontal transfer signal, second horizontal sync signal corresponding to the second horizontal transfer signal and a second horizontal blanking signal for a period other than the horizontal extraction period, to thereby make high-rate transfer and sweep-away of valid ones, of all valid charges supplied to the horizontal transfer unit, which correspond to a period other than the horizontal extraction period in response to the second horizontal transfer signal and extract the valid charges corresponding to the horizontal extraction period as a valid video signal from the horizontal transfer unit by a normal-rate transfer with the first horizontal transfer signal.

According to the present invention, there is also provided an imaging device including an interline transfer type solid-state image sensing device including a light-receiving unit in which there is disposed in the form of a matrix a plurality of light-receiving elements each of which produces and stores a charge corresponding to the amount of light incident thereupon, vertical transfer units to transfer a charge read from each of the light-receiving elements in the light-receiving unit, and a horizontal transfer unit to output the charges transferred via the vertical transfer units, the interline transfer type solid-state image sensing device being adapted such that the charge stored in each of the plurality of light-receiving elements is read to the vertical transfer units synchronously with the timing of an external trigger signal, the charges read to the vertical transfer units are vertically transferred at a first transfer rate in response to a high-rate vertical transfer signal for a high-rate transfer period, and the charges in the vertical transfer units are vertically transferred at a second transfer rate slower than the first transfer rate in response to a normal-rate vertical transfer signal for a normal-rate transfer period following the high-rate transfer period, to thereby output the charges supplied to the horizontal transfer unit for the normal-rate transfer period as valid ones from the horizontal transfer unit, the imaging device including a parameter setting block to set an arbitrary horizontal extraction period in a horizontal sync period, a horizontal transfer signal generator to generate a first horizontal transfer signal and a second horizontal transfer signal whose rate is higher than that of the first horizontal transfer signal, a horizontal transfer signal switching means for switching the first horizontal transfer signal and second horizontal transfer signal which is to be transferred at a higher rate than the first horizontal transfer signal, supplied from the horizontal transfer signal generator, between the horizontal extraction period set by the parameter setting block and a period other than the horizontal extraction period, a horizontal sync signal generator to generate a first horizontal sync signal corresponding to the first horizontal transfer signal and a first horizontal blanking signal, and a second horizontal sync signal corresponding to the second horizontal transfer signal and a second horizontal blanking signal, a horizontal sync signal switching means for switching the first horizontal sync signal and horizontal blanking signal and the second horizontal sync signal and horizontal blanking signal, supplied from the horizontal sync signal generator, between the horizontal extraction period set by the parameter setting block and a period other than the horizontal extraction period, and a vertical sync signal generator to generate a vertical sync signal and vertical blanking signal by counting the horizontal sync signals supplied from the horizontal sync signal generator via the horizontal sync signal switching means, the imaging device controlling the interline transfer type solid-state image sensing device by making a selection between the first horizontal transfer signal and second horizontal transfer signal which is to be transferred at a higher rate than the first horizontal transfer signal while making a selection between the first horizontal sync signal corresponding to the first horizontal transfer signal and a first horizontal blanking signal and the second horizontal sync signal corresponding to the second horizontal transfer signal and a second horizontal blanking signal, to provide the first horizontal transfer signal, first horizontal sync signal corresponding to the first horizontal transfer signal and the first horizontal blanking signal for the horizontal extraction period while providing the second horizontal transfer signal and second horizontal sync signal corresponding to the second horizontal transfer signal, and second horizontal blanking signal for a period other than the horizontal extraction period, to thereby make high-rate transfer and sweep-away of valid ones, of all valid charges supplied to the horizontal transfer unit, which correspond to a period other than the horizontal extraction period in response to the second horizontal transfer signal and extract the valid charges corresponding to the horizontal extraction period as a valid video signal from the horizontal transfer unit by a normal-rate transfer with the first horizontal transfer signal.

According to the present invention, unnecessary video data can be reduced more efficiently and higher-rate image information can be acquired by selecting a horizontal image range having a high freedom. Also, the image range can be controlled by a serial interface, manipulated with a high user-friendliness and easily controlled from a remote place.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described in detail below concerning embodiments thereof with reference to the accompanying drawings.

Figure 1:
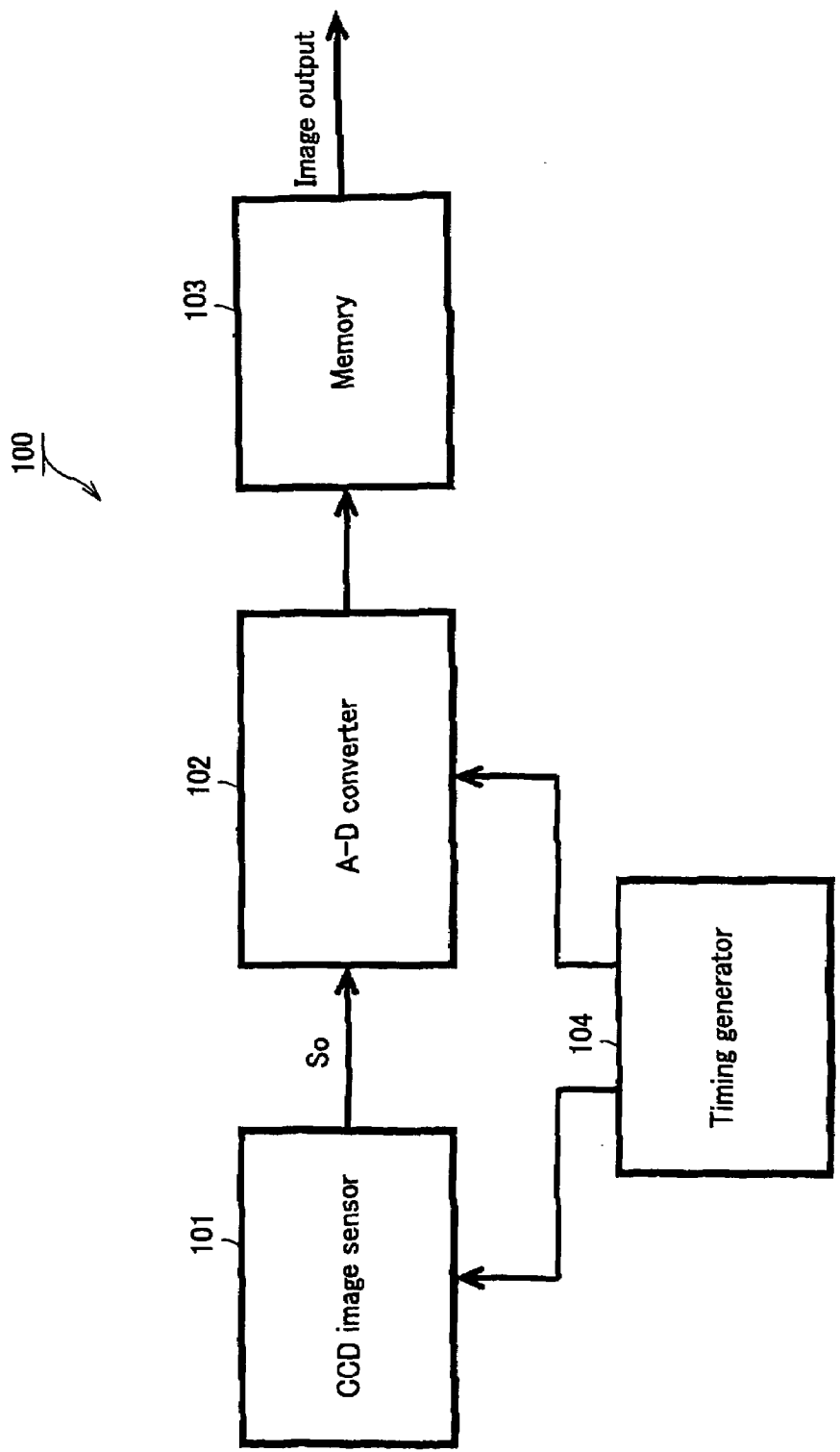
FIG. 1 is a schematic block diagram of a conventional imaging device capable of extracting a horizontal image from a valid image output.
Figure 2:
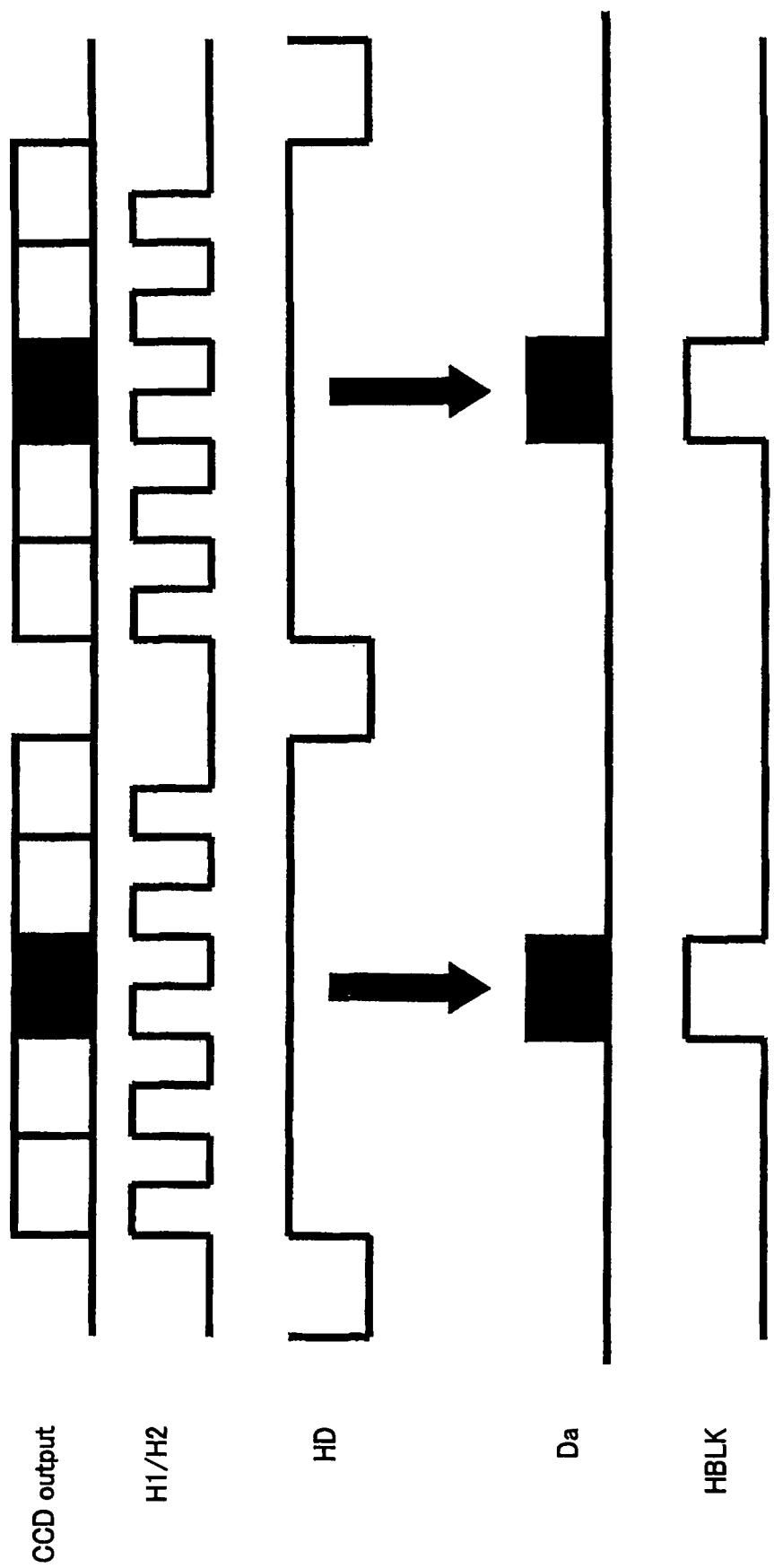
FIG. 2 is a timing diagram according to which the conventional imaging device operates.
Figure 3:
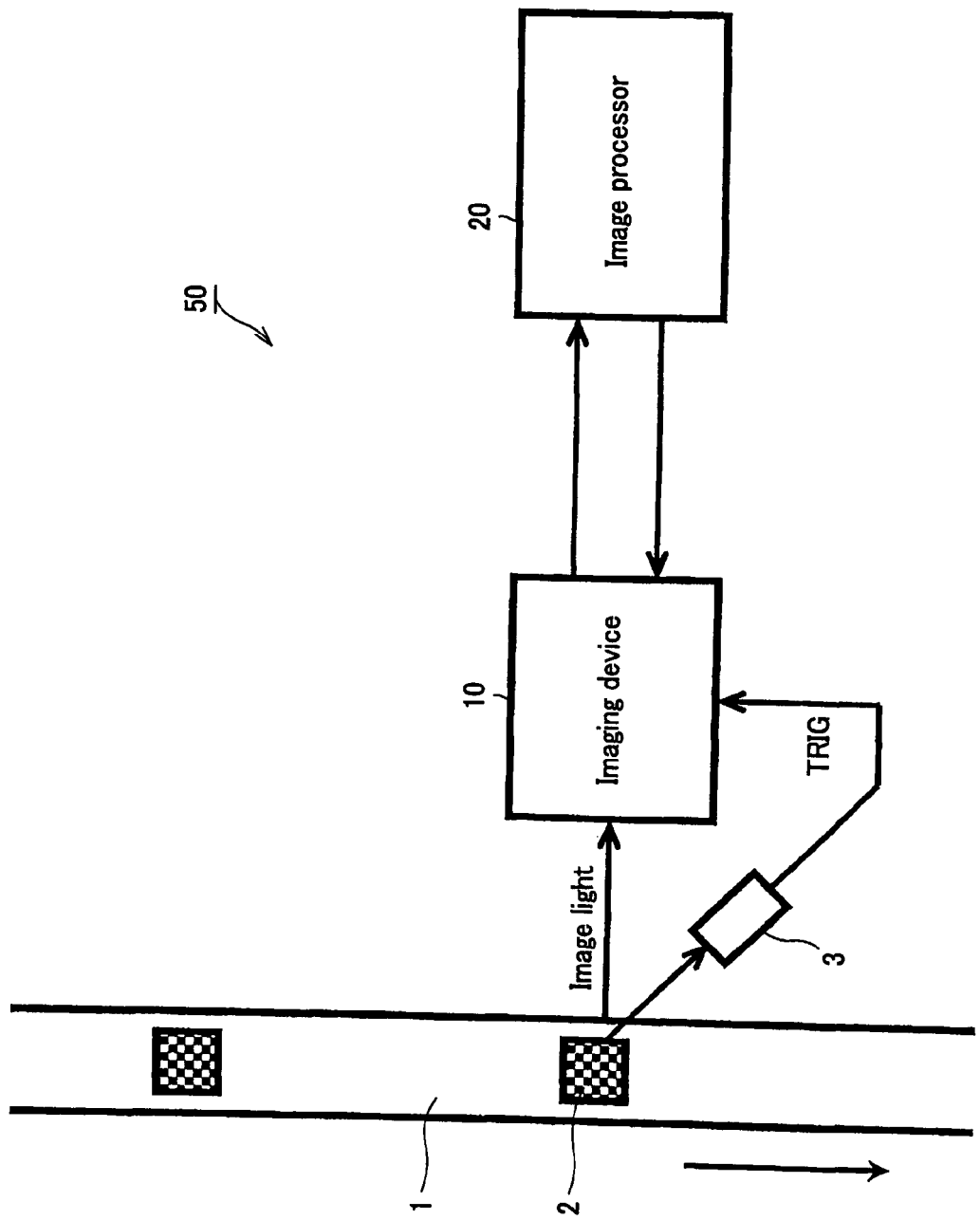
FIG. 3 is a schematic block diagram of the imaging system according to the present invention.

The present invention is applied to an imaging system, generally indicated with a reference numeral 50, constructed as schematically shown in FIG. 3.

In the imaging system 50, an object 2 being carried on a transfer path 1 such as a belt conveyor or the like is detected by an object sensor 3, it is imaged by an imaging device 10 on the basis of a detection output from the object sensor 3, and the captured image is taken in as a still picture. The image data captured by the imaging device 10 by imaging the object 2 on the basis of the detection output from the object sensor 3 is supplied to an image processor 20 also included in the imaging system 50.

In the imaging system 50, the object sensor 3 detects the object 2 being carried on the transfer path 1, a trigger signal TRIG is generated when the object 2 arrives at the front of the object sensor 3, and the trigger signal TRIG is supplied to the imaging device 10.

Figure 4:
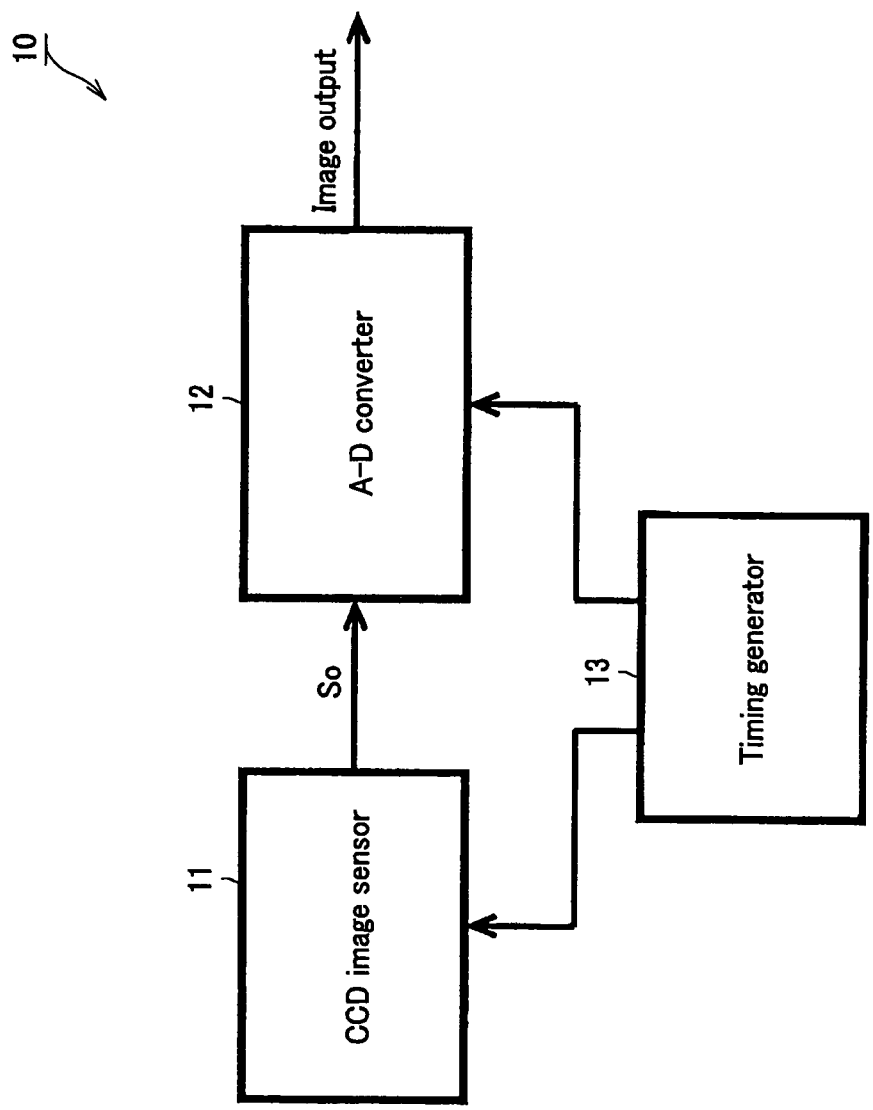
FIG. 4 is also a schematic block diagram of an imaging device included in the imaging system in FIG. 3.

As shown in FIG. 4, the imaging device 10 includes a CCD image sensor 1, analog-digital converter 12 that digitizes an image signal ($S_o$) read from the CCD image sensor 11 and outputs it, and a timing generator 13 that gives an operation clock to each of the above other components of the imaging device 10.

Figure 5:
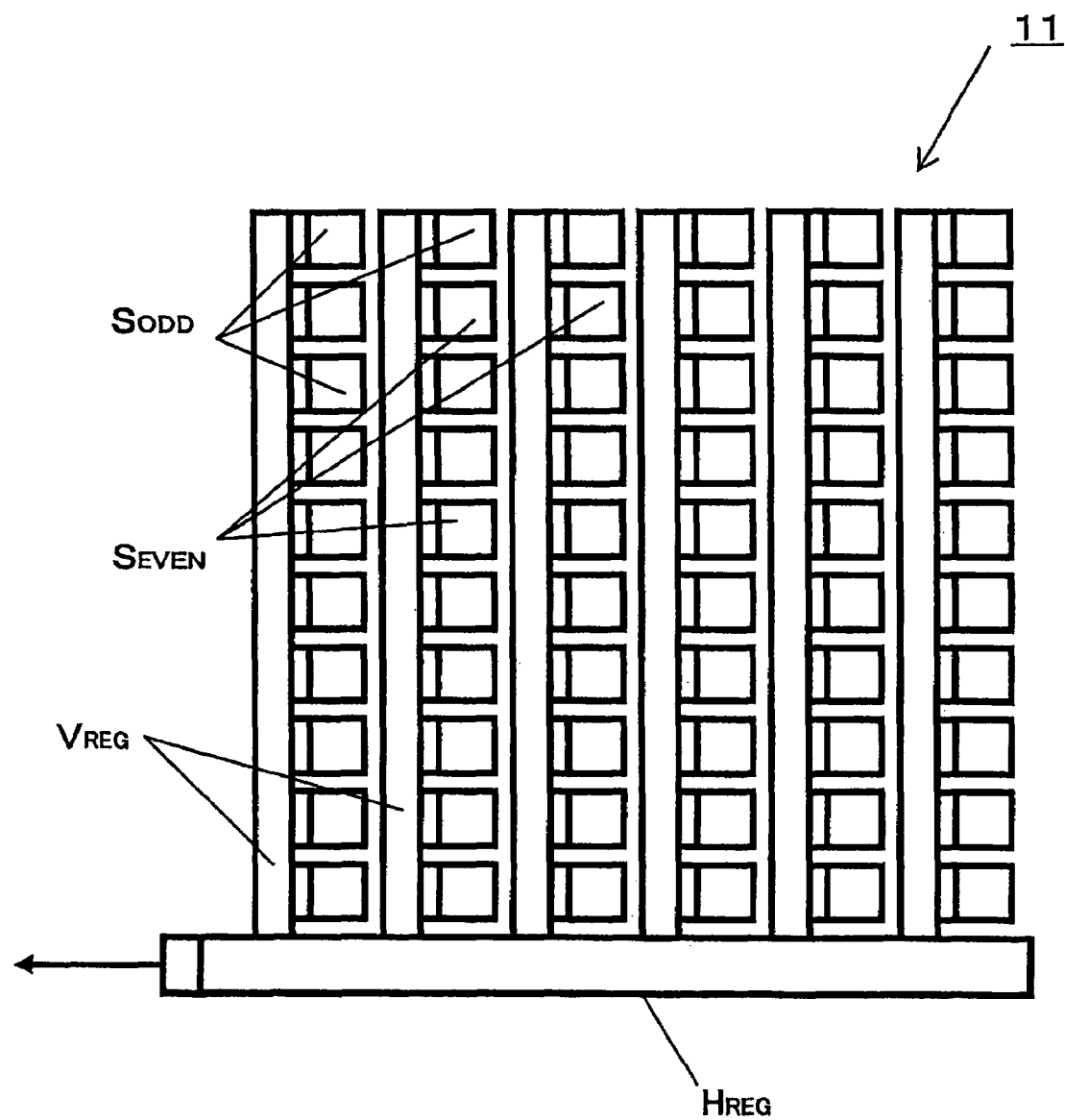
FIG. 5 is a schematic plan view of an IT (interline transfer) type CCD image sensor included in the imaging device.

The CCD image sensor 11 is of an interline transfer (IT) type constructed as shown in FIG. 5. It includes light-receiving elements $S_{ODD}$ corresponding to pixels in odd fields and light-receiving elements $S_{EVEN}$ corresponding to pixels in even fields, vertical transfer units $V_{REG}$ to which charges stored in the light-receiving elements $S_{ODD}$ and $S_{EVEN}$ are read, and a horizontal transfer unit $H_{REG}$ that outputs the charges read to the vertical transfer units $V_{REG}$ as image signals in units of one horizontal line. The CDD image sensor 11 performs an electronic shutter function by controlling the potential on a substrate (not shown) formed under the light-receiving elements $S_{ODD}$ and $S_{EVEN}$ to sweep away the charges stored in the light-receiving elements $S_{ODD}$ and $S_{EVEN}$ to the substrate in order to control the length of charge storage time.

Note here that in the imaging device 10, the CCD image sensor 11 is an interline transfer (IT) type for SXGA in which 1280.times.1024 pixels are taken as an effective image area.

The CCD image sensor 11 is driven the timing generator 13 to read the charges stored in the plurality of light-receiving elements $S_{ODD}$ and $S_{EVEN}$ to the vertical transfer units $V_{REG}$ synchronously with the external trigger signal TRIG, transfer the charges read to the vertical transfer units $V_{REG}$ vertically at a first rate in response to a high-rate vertical transfer signal for the high-rate transfer period and transfer the charges in the vertical transfer units $V_{REG}$ vertically at a second rate slower than the first rate in response to a normal-rate vertical transfer signal for a normal-rate transfer period following the high-rate transfer period, to thereby output the charges supplied to the horizontal transfer unit $H_{REG}$ for the normal-rate transfer period as valid ones from the horizontal transfer unit $H_{REG}$.

Figure 6:
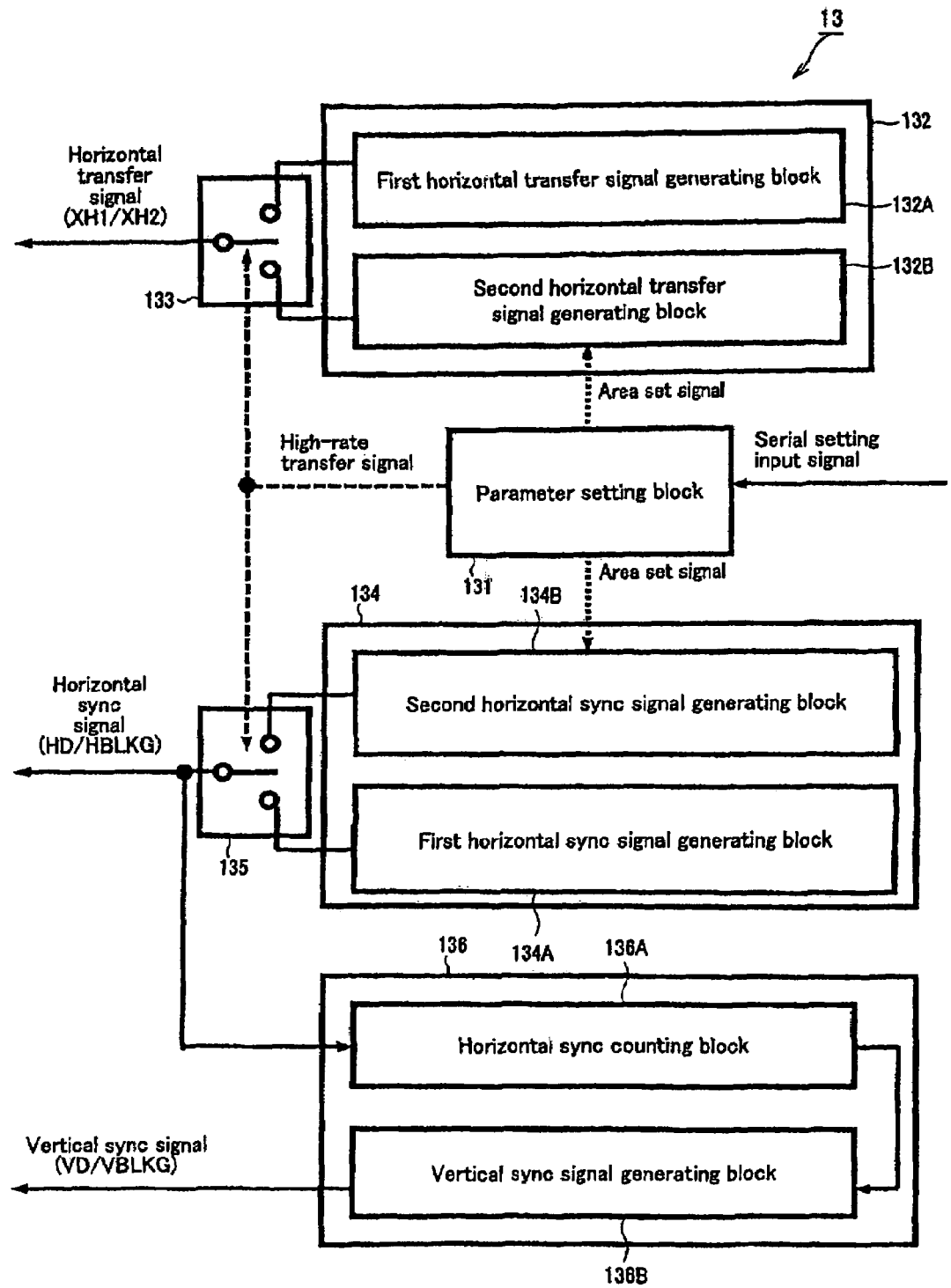
FIG. 6 is a schematic block diagram of the substantial part of a timing generator included in the imaging device.

The timing generator 13 in the imaging device 10 has the substantial part thereof illustrated in FIG. 6. As shown, it includes a parameter setting block 131 to set parameters via a serial interface such as USB in response to a serial set signal supplied from the image processor 20, horizontal transfer signal generator 132 to generate a horizontal transfer signal corresponding to a parameter set in the parameter setting block 131, horizontal transfer signal switch 133 to select a path for a horizontal transfer signal output from the horizontal transfer signal generator 132, horizontal sync signal generator 134 to generate a horizontal sync signal corresponding to a parameter set in the parameter setting block 131, horizontal sync signal switch 135 to select a path for a horizontal sync signal output from the horizontal sync signal generator 134, vertical sync signal generator 136 to generate a vertical sync signal VD and vertical blanking signal VBLK by counting horizontal sync signals HD supplied via the horizontal sync signal switch 135, etc.

The horizontal transfer signal generator 132 includes a first horizontal transfer signal generating block 132A to generate a first horizontal transfer signal which is to be transferred at a normal rate, and a second horizontal transfer signal generating block 132B to generate a second horizontal transfer signal which is to be transferred at a rate higher than the first horizontal transfer signal.

Also, the horizontal sync signal generator 134 includes a first horizontal sync signal generating block 134A to generate a first horizontal sync signal corresponding to the first horizontal transfer signal and which is to be transferred at a normal rate and a first horizontal blanking signal, and a second horizontal sync signal generating block 134B to generate a second horizontal sync signal corresponding to the second horizontal transfer signal which is to be transferred to a high rate and a second horizontal blanking signal.

The vertical sync signal generator 136 includes a horizontal sync counting block 136A to count horizontal sync signals HD supplied from the horizontal sync signal generator 134 via the horizontal sync signal switch 135, and a vertical sync signal generating block 136B to generate a vertical sync signal VD and vertical blanking signal VBLK on the basis of the count output from the horizontal sync counting block 136A.

Figure 7:
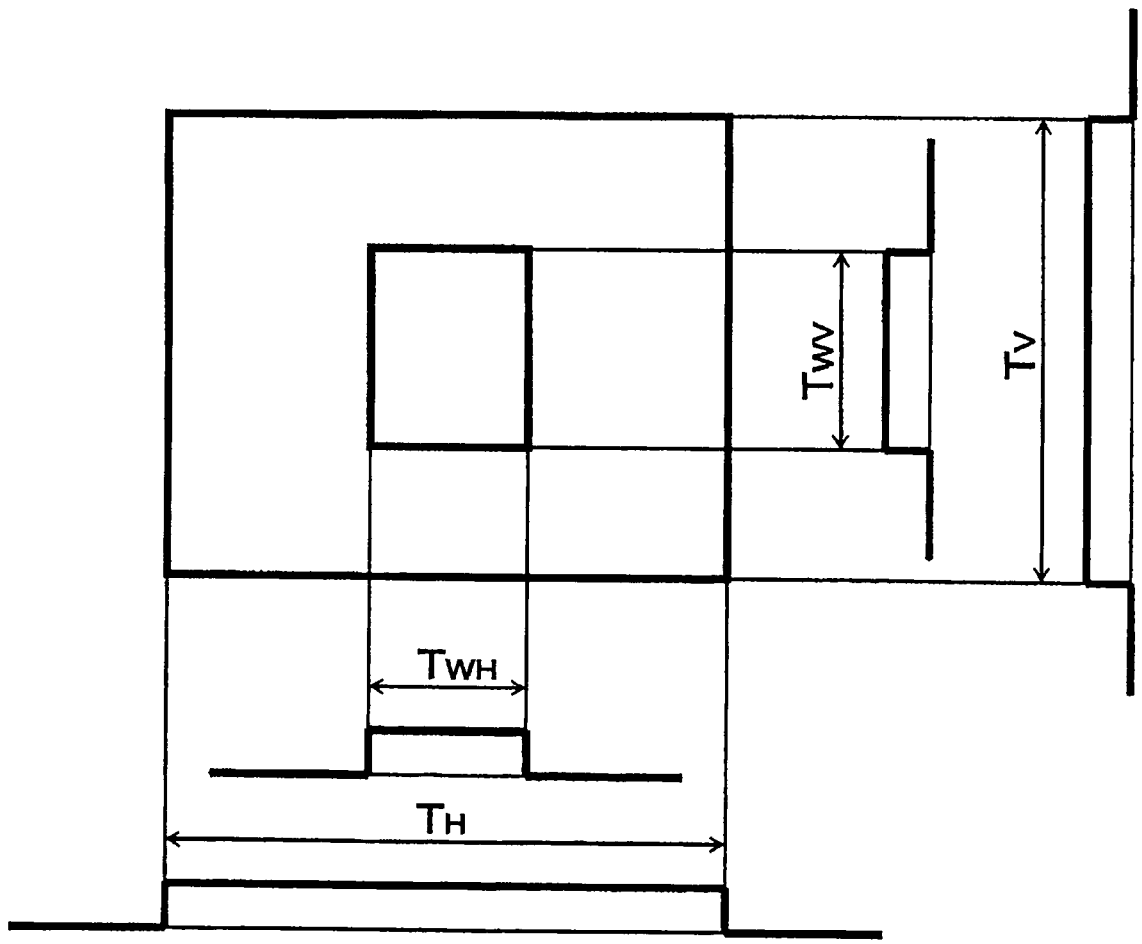
FIG. 7 schematically illustrates a vertical extraction period and horizontal extraction period, set in a parameter setting block included in the timing generator.

In the timing generator 13, when supplied with a high-rate horizontal transfer/high-rate transfer area command from the image processor 20 via the serial interface, the parameter setting block 131 sets an arbitrary vertical extraction period $T_{WV}$ in a vertical sync period $T_V$ and an arbitrary horizontal extraction period $T_{WH}$ in a horizontal sync period $T_H$ as shown in FIG. 7. Thus, in the imaging device 10, a desired extraction image area to be extracted from all captured images available in the effective imaging area of the CCD image sensor 11 is arbitrarily designated.

In response to the high-rate transfer area command supplied to the parameter setting block 131, an area set signal is sent to the horizontal transfer signal generator 132 and horizontal sync signal generator 134 to recognize which area is the high-rate transfer area, and a horizontal transfer signal XH1/XH2, horizontal sync signal HD/HBLKG and vertical sync signal VD/VBLKG, corresponding to the area setting, are set.

Figure 8:
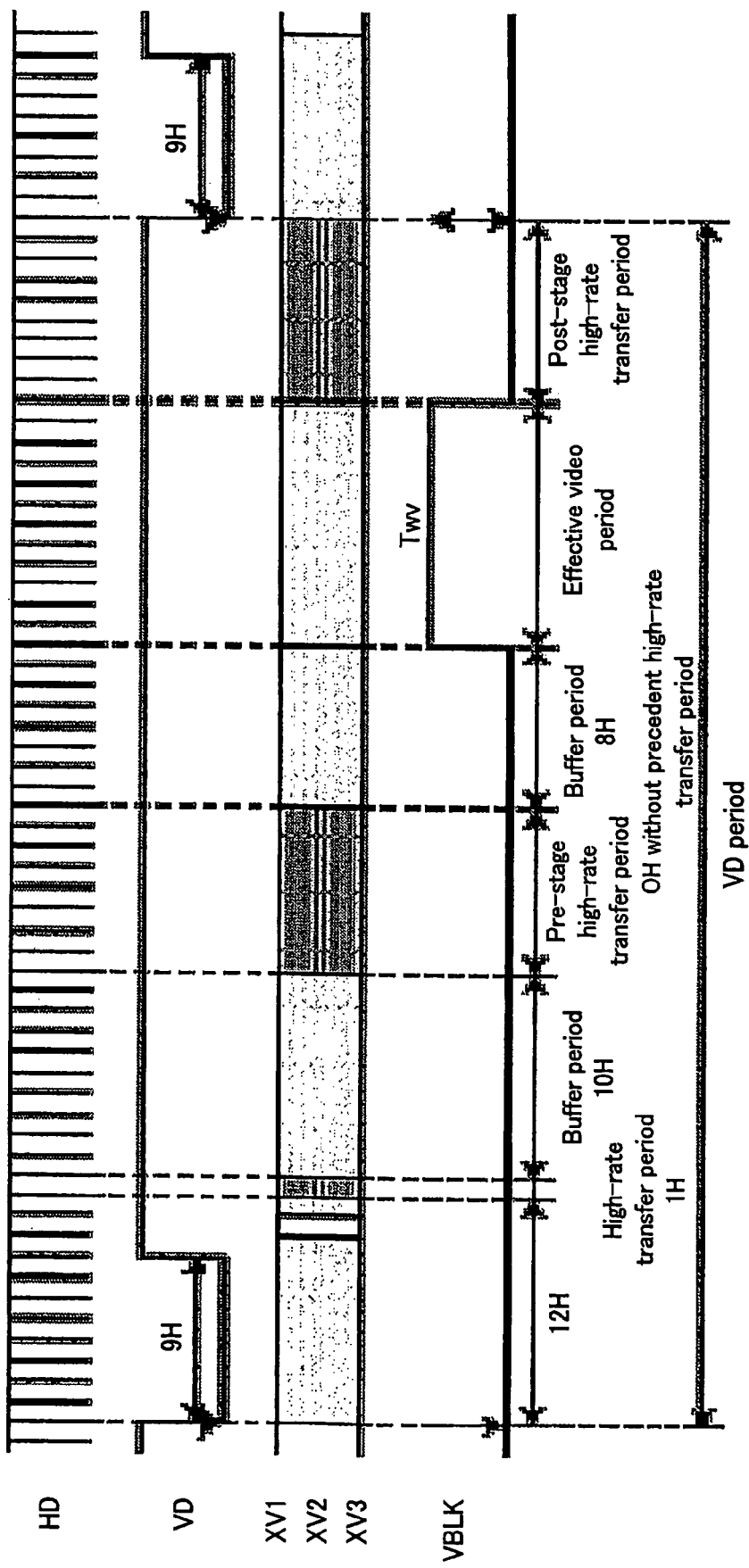
FIG. 8 is a timing diagram according to which vertical data extraction is done in the imaging device.
Figure 9:
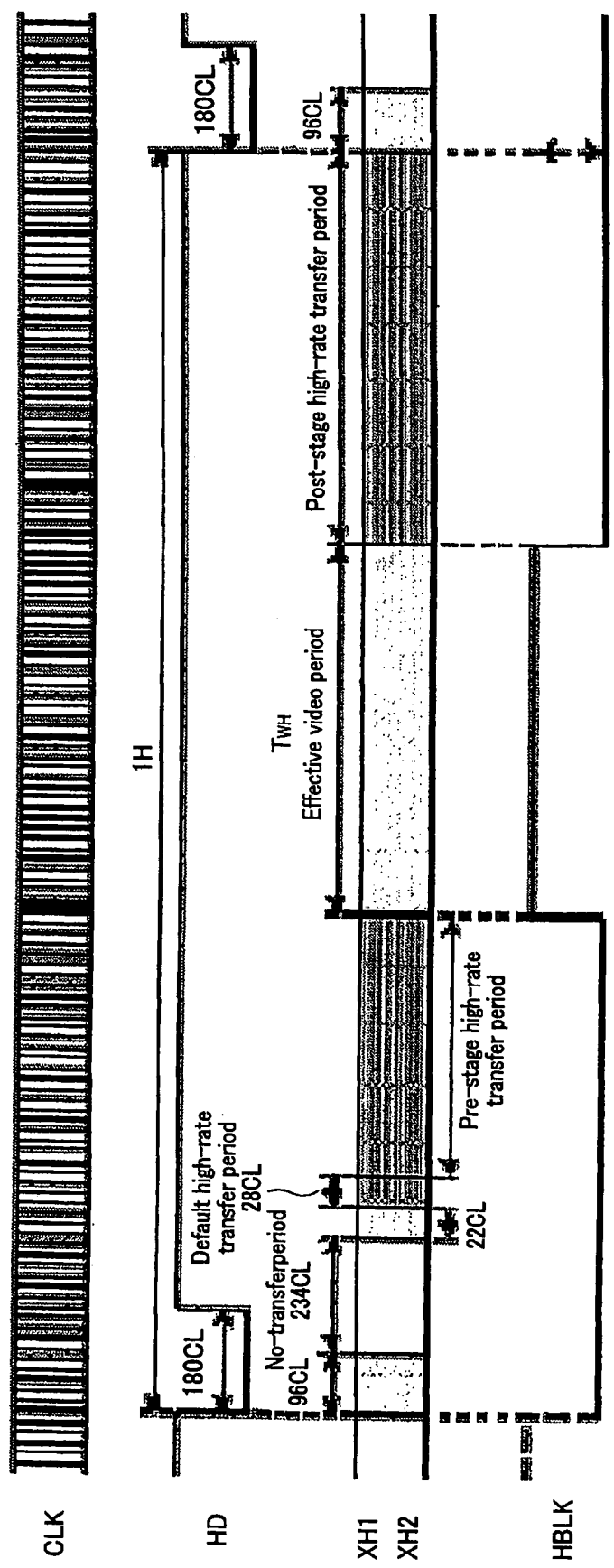
FIG. 9 is also a timing diagram according to which horizontal data extraction is done in the imaging device.

Also, the horizontal transfer signal switch 133 and horizontal sync signal switch 135 are controlled according to the high-rate transfer area command supplied to the parameter setting block 131 to make a selection between the first horizontal transfer signal and second horizontal transfer signal which is to be transferred at a higher rate than the first horizontal transfer signal while making a selection between the first horizontal sync signal corresponding to the first horizontal transfer signal and a first horizontal blanking signal and the second horizontal sync signal corresponding to the second horizontal transfer signal and a second horizontal blanking signal to provide the vertical transfer signal corresponding to the first horizontal sync signal which is to be transferred at the normal rate for the vertical extraction period $T_{WV}$ while providing the vertical transfer signal corresponding to the second horizontal sync signal which is to be transferred at the high rate for a period other than the vertical extraction period $T_{WV}$ to drive the CCD image sensor 11 in order to make vertical transfer with vertical transfer signals XV1, XV2 and XV3 as shown in FIG. 8, and further provide the first horizontal transfer signal, first horizontal sync signal corresponding to the first horizontal transfer signal and the first horizontal blanking signal for the horizontal extraction period T.sub.WH while providing the second horizontal transfer signal and second horizontal sync signal corresponding to the second horizontal transfer signal and the second horizontal blanking signal for a period other than the horizontal extraction period T.sub.WH to drive the CCD image sensor 11 in order to make horizontal transfer with horizontal transfer signals XH1 and XH2 as shown in FIG. 9, to thereby make high-rate transfer and sweep-away of valid ones of all valid charges supplied to the horizontal transfer unit H.sub.REG, corresponding to a period other than the horizontal extraction period T.sub.WH, with the second horizontal transfer signal for the normal-rate transfer period and extract valid charges corresponding to the horizontal extraction period T.sub.WH as valid video signal from the horizontal transfer unit H.sub.REG in response to the first horizontal transfer signal.

Note that in the imaging device 10, a buffer period for which vertical transfer is made at the normal rate is provided in the high-rate transfer period before the vertical extraction period T.sub.WV as shown in FIG. 8 to stabilize the high-rate vertical transfer in the vertical extraction period T.sub.WV.

Figure 10:
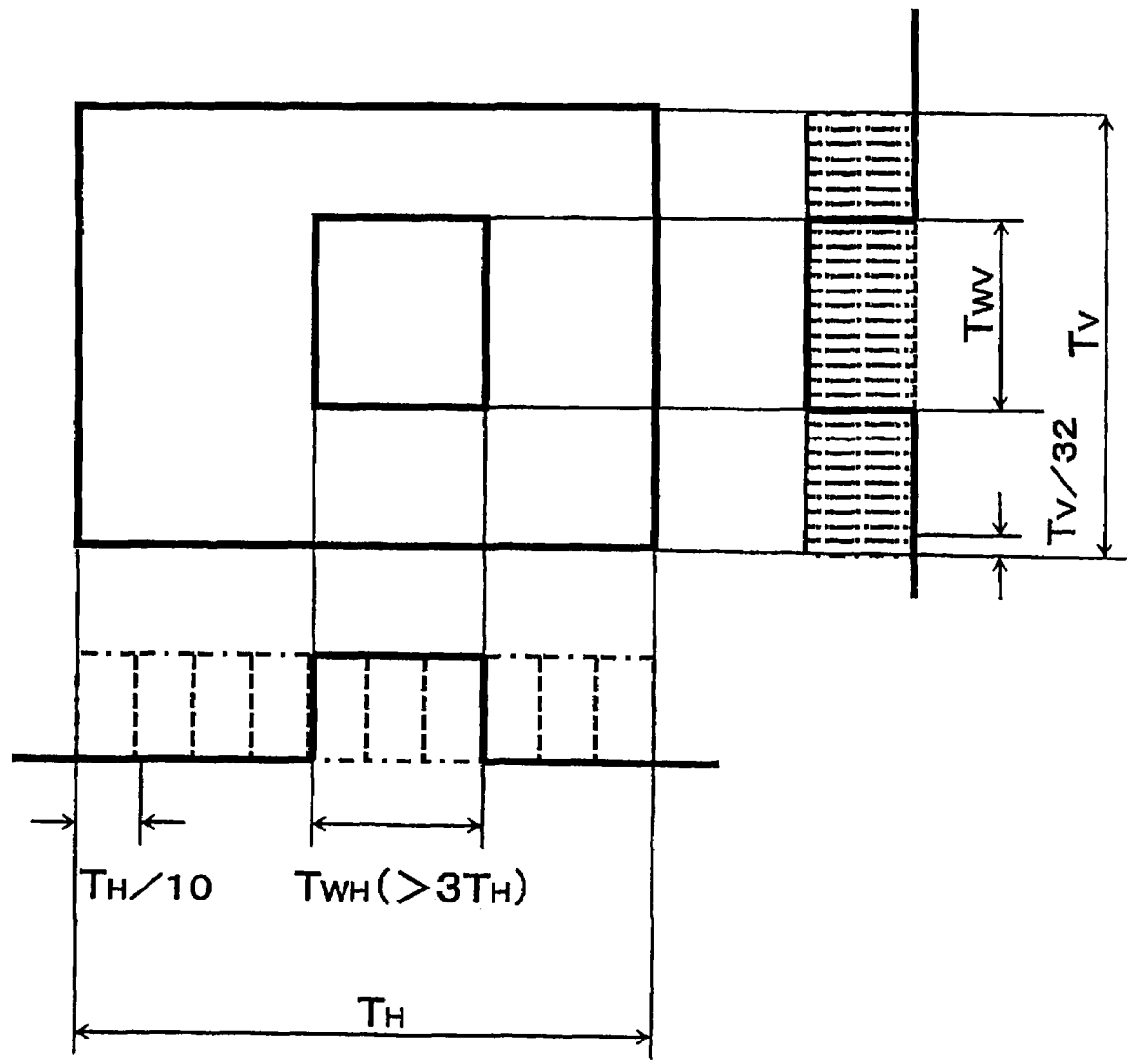
FIG. 10 schematically illustrates the horizontal extraction period set in the parameter setting block.

Note here that in the parameter setting block 131 of the imaging device 10, the effective image area of the CCD image sensor 11 is horizontally divided into 10 sub-areas and a period corresponding to more than three successive sub-areas is arbitrarily set as the horizontal extraction period T.sub.WH in the horizontal sync period via the serial interface, as shown in FIG. 10.

Figure 11:
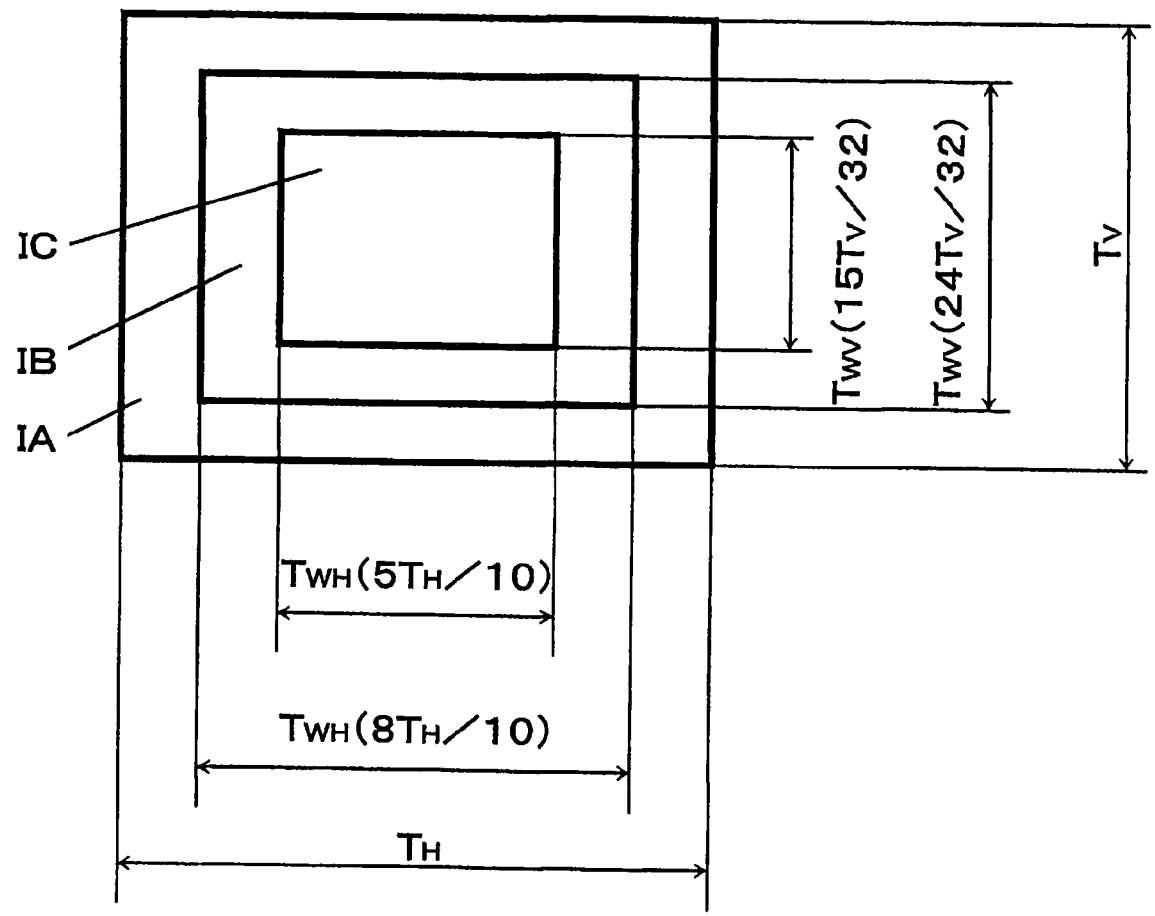
FIG. 11 schematically illustrates an image corresponding to VGA and image corresponding to XGA, extracted from the CCD image sensor in the imaging device.

Thus, the imaging device 10 can extract an image IC corresponding to VGA whose effective image area is of 640.times.480 pixels directly from the CCD image sensor 11 for SXGA whose effective image area IA is of 1280.times.1024 pixels by setting a horizontal extraction period TWH corresponding to, for example, 5 successive ones of the 10 horizontal sub-areas and a vertical extraction period T.sub.WV corresponding to 15 successive ones of 32 vertical sub-areas, and also extract an image IB corresponding to XGA whose effective image area is of 1024.times.780 pixels directly from the CCD image sensor 11 for SXGA whose effective image area is of 1280.times.1024 pixels by setting a horizontal extraction period T.sub.WH corresponding to, for example, 8 successive ones of the 10 horizontal sub-areas and a vertical extraction period T.sub.WV corresponding to 24 successive ones of the 32 vertical sub-areas, which will be known from FIG. 11.

Figure 12:
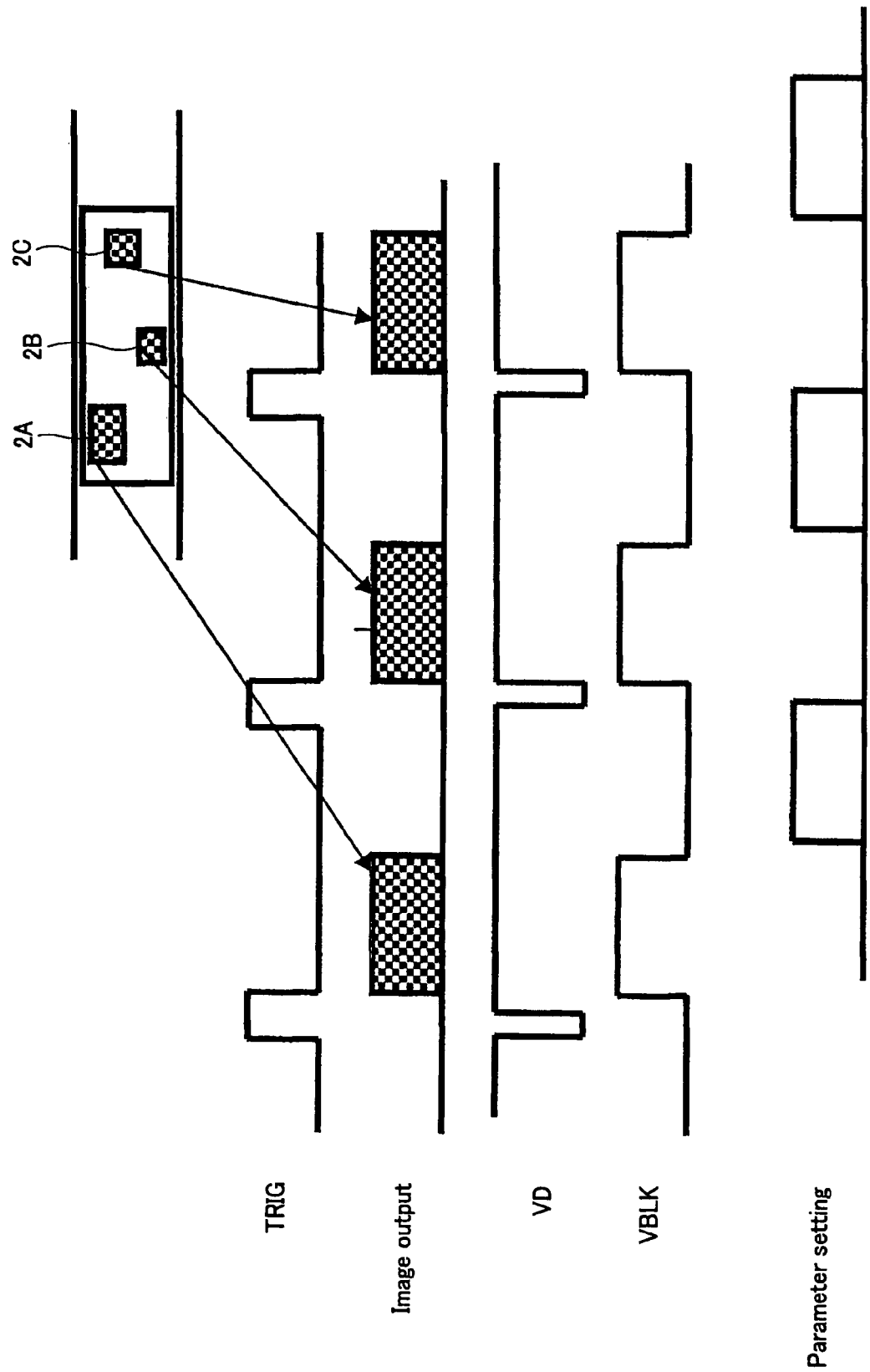
FIG. 12 is a timing diagram according to which a plurality of objects in predetermined different places on a substrate is captured one after another in the imaging system.

Also, in the imaging system 50, since it is possible to extract an arbitrary area from the effective image area of the CCD image sensor 11 of the imaging device 10, each time an object 2 is imaged synchronously with the trigger signal TRIG, a plurality of objects 2A, 2B and 2C provided in, for example, predetermined different places on a substrate can be captured one after another by setting a horizontal extraction period T.sub.WH and vertical extraction period T.sub.WV, namely, extraction areas, as shown in FIG. 12.

It should be understood by those skilled in the art that various modifications, combinations, sub-combinations and alterations may occur depending on design requirements and other factors insofar as they are within the scope the appended claims or the equivalents thereof.

What is claimed is:

1. A driving controlling method for an interline transfer type solid-state image sensing device comprising:
    a light-receiving unit in which there is disposed, in the form of a matrix, a plurality of light-receiving elements each light-receiving element produces and stores a charge corresponding to the amount of light incident thereupon;
    one or more vertical transfer units to transfer a charge read from each of the light-receiving elements in the light-receiving unit; and
    a horizontal transfer unit to output the charges transferred via the vertical transfer units,
    wherein the interline transfer type solid-state image sensing device being adapted such that the charge stored in each of the plurality of light-receiving elements is read to the vertical transfer units synchronously with the timing of an external trigger signal,
    wherein the charges read to the vertical transfer units are vertically transferred at a first transfer rate in response to a high-rate vertical transfer signal for a high-rate transfer period, and
    wherein the charges in the vertical transfer units are vertically transferred at a second transfer rate slower than the first transfer rate in response to a normal-rate vertical transfer signal for a normal-rate transfer period following the high-rate transfer period,
        to thereby output the charges supplied to the horizontal transfer unit for the normal-rate transfer period as valid ones from the horizontal transfer unit,
    wherein the interline transfer type solid-state image sensing device is driven by:
    setting an arbitrary horizontal extraction period in a horizontal sync period and setting an arbitrary vertical extraction period in a vertical sync period; and
    making a selection between:
        a first horizontal transfer signal and a second horizontal transfer signal which is to be transferred at a higher rate than the first horizontal transfer signal
            while selection is made between a first horizontal sync signal corresponding to the first horizontal transfer signal and a first horizontal blanking signal and a second horizontal sync signal corresponding to the second horizontal transfer signal and a second horizontal blanking signal,
            to provide the first horizontal transfer signal, first horizontal sync signal corresponding to the first horizontal transfer signal and the first horizontal blanking signal for the horizontal extraction period while providing the second horizontal transfer signal,
        wherein the second horizontal sync signal corresponding to the second horizontal transfer signal and a second horizontal blanking signal for a period other than the horizontal extraction period,
            to thereby make high-rate transfer and sweep-away of valid ones, of all valid charges supplied to the horizontal transfer unit, which correspond to a period other than the horizontal extraction period in response to the second horizontal transfer signal and extract the valid charges corresponding to the horizontal extraction period as a valid video signal from the horizontal transfer unit by a normal-rate transfer with the first horizontal transfer signal.

2. The method according to claim 1, wherein
    the effective image area of the interline transfer type solid-state image sensing device is horizontally divided into 10 sub-areas, and
    a period corresponding to more than three successive sub-areas is arbitrary set as the horizontal extraction period in the horizontal sync period.

3. An imaging device including an interline transfer type solid-state image sensing device including:
    a light-receiving unit in which there is disposed in the form of a matrix a plurality of light-receiving elements each of which produces and stores a charge corresponding to the amount of light incident thereupon;

vertical transfer units to transfer a charge read from each of the light-receiving elements in the light-receiving unit; and a horizontal transfer unit to output the charges transferred via the vertical transfer units, wherein the interline transfer type solid-state image sensing device being adapted such that the charge stored in each of the plurality of light-receiving elements is read to the vertical transfer units synchronously with the timing of an external trigger signal, wherein the charges read to the vertical transfer units are vertically transferred at a first transfer rate in response to a high-rate vertical transfer signal for a high-rate transfer period, and wherein the charges in the vertical transfer units are vertically transferred at a second transfer rate slower than the first transfer rate in response to a normal-rate vertical transfer signal for a normal-rate transfer period following the high-rate transfer period, to thereby output the charges supplied to the horizontal transfer unit for the normal-rate transfer period as valid ones from the horizontal transfer unit, the imaging device comprising:

a parameter setting block to set an arbitrary horizontal extraction period in a horizontal sync period and to set an arbitrary vertical extraction period in a vertical sync period;

a horizontal transfer signal generator to generate a first horizontal transfer signal and a second horizontal transfer signal whose rate is higher than that of the first horizontal transfer signal;

a horizontal transfer signal switching means for switching the first horizontal transfer signal and second horizontal transfer signal which is to be transferred at a higher rate than the first horizontal transfer signal, supplied from the horizontal transfer signal generator, between the horizontal extraction period set by the parameter setting block and a period other than the horizontal extraction period;

a horizontal sync signal generator to generate a first horizontal sync signal corresponding to the first horizontal transfer signal and a first horizontal blanking signal, and a second horizontal sync signal corresponding to the second horizontal transfer signal and a second horizontal blanking signal;

a horizontal sync signal switching means for switching the first horizontal sync signal and horizontal blanking signal and the second horizontal sync signal and horizontal blanking signal, supplied from the horizontal sync signal generator, between the horizontal extraction period set by the parameter setting block and a period other than the horizontal extraction period; and a vertical sync signal generator to generate a vertical sync signal and vertical blanking signal by counting the horizontal sync signals supplied from the horizontal sync signal generator via the horizontal sync signal switching means, the imaging device controlling the interline transfer type solid-state image sensing device by making a selection between:

the first horizontal transfer signal and second horizontal transfer signal which is to be transferred at a higher rate than the first horizontal transfer signal while making a selection between the first horizontal sync signal corresponding to the first horizontal transfer signal and a first horizontal blanking signal and the second horizontal sync signal corresponding to the second horizontal transfer signal and a second horizontal blanking signal, to provide the first horizontal transfer signal, first horizontal sync signal corresponding to the first horizontal transfer signal and the first horizontal blanking signal for the horizontal extraction period while providing the second horizontal transfer signal and second horizontal sync signal corresponding to the second horizontal transfer signal, and second horizontal blanking signal for a period other than the horizontal extraction period, to thereby make high-rate transfer and sweep-away of valid ones, of all valid charges supplied to the horizontal transfer unit, which correspond to a period other than the horizontal extraction period in response to the second horizontal transfer signal and extract the valid charges corresponding to the horizontal extraction period as a valid video signal from the horizontal transfer unit by a normal-rate transfer with the first horizontal transfer signal.

4. The device according to claim 3, wherein the effective image area of the interline transfer type solid-state image sensing device is horizontally divided into 10 sub-areas, and a period corresponding to more than three successive sub-areas is arbitrary set as the horizontal extraction period in the horizontal sync period via a serial interface.

5. An imaging device including an interline transfer type solid-state image sensing device including:

a light-receiving unit in which there is disposed in the form of a matrix a plurality of light-receiving elements each of which produces and stores a charge corresponding to the amount of light incident thereupon;

vertical transfer units to transfer a charge read from each of the light-receiving elements in the light-receiving unit; and a horizontal transfer unit to output the charges transferred via the vertical transfer units, wherein the interline transfer type solid-state image sensing device being adapted such that wherein the charge stored in each of the plurality of light-receiving elements is read to the vertical transfer units synchronously with the timing of an external trigger signal, wherein the charges read to the vertical transfer units are vertically transferred at a first transfer rate in response to a high-rate vertical transfer signal for a high-rate transfer period, and wherein the charges in the vertical transfer units are vertically transferred at a second transfer rate slower than the first transfer rate in response to a normal-rate vertical transfer signal for a normal-rate transfer period following the high-rate transfer period, to thereby output the charges supplied to the horizontal transfer unit for the normal-rate transfer period as valid ones from the horizontal transfer unit, the imaging device comprising:

a parameter setting block to set an arbitrary horizontal extraction period in a horizontal sync period and to set an arbitrary vertical extraction period in a vertical sync period;

a horizontal transfer signal generator to generate a first horizontal transfer signal and a second horizontal transfer signal whose rate is higher than that of the first horizontal transfer signal;

a horizontal transfer signal switch for switching the first horizontal transfer signal and second horizontal transfer signal which is to be transferred at a higher rate than the first horizontal transfer signal, supplied from the horizontal transfer signal generator, between the horizontal extraction period set by the parameter setting block and a period other than the horizontal extraction period;

a horizontal sync signal generator to generate a first horizontal sync signal corresponding to the first horizontal transfer signal and a first horizontal blanking signal, and a second horizontal sync signal corresponding to the second horizontal transfer signal and a second horizontal blanking signal;

a horizontal sync signal switch for switching the first horizontal sync signal and horizontal blanking signal and the second horizontal sync signal and horizontal blanking signal, supplied from the horizontal sync signal generator, between the horizontal extraction period set by the parameter setting block and a period other than the horizontal extraction period; and a vertical sync signal generator to generate a vertical sync signal and vertical blanking signal by counting the horizontal sync signals supplied from the horizontal sync signal generator via the horizontal sync signal switch, the imaging device controlling the interline transfer type solid-state image sensing device by making a selection between:

the first horizontal transfer signal and second horizontal transfer signal which is to be transferred at a higher rate than the first horizontal transfer signal while making a selection between the first horizontal sync signal corresponding to the first horizontal transfer signal and a first horizontal blanking signal and the second horizontal sync signal corresponding to the second horizontal transfer signal and a second horizontal blanking signal, to provide the first horizontal transfer signal, first horizontal sync signal corresponding to the first horizontal transfer signal and the first horizontal blanking signal for the horizontal extraction period while providing the second horizontal transfer signal and second horizontal sync signal corresponding to the second horizontal transfer signal, and second horizontal blanking signal for a period other than the horizontal extraction period, to thereby make high-rate transfer and sweep-away of valid ones, of all valid charges supplied to the horizontal transfer unit, which correspond to a period other than the horizontal extraction period in response to the second horizontal transfer signal and extract the valid charges corresponding to the horizontal extraction period as a valid video signal from the horizontal transfer unit by a normal-rate transfer with the first horizontal transfer signal.

* * * * *

UNITED STATES PATENT AND TRADEMARK OFFICE
CERTIFICATE OF CORRECTION

PATENT NO. : 7,609,312 B2
APPLICATION NO. : 11/387266
DATED : October 27, 2009
INVENTOR(S) : Komori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 768 days.

Signed and Sealed this

Twelfth Day of October, 2010

David J. Kappos
*Director of the United States Patent and Trademark Office*